United States Patent
Zhang et al.

(10) Patent No.: US 10,977,203 B2
(45) Date of Patent: Apr. 13, 2021

(54) DATA TRANSMISSION METHOD AND APPARATUS USED IN VIRTUAL SWITCH TECHNOLOGY

(71) Applicant: HUAWEI TECHNOLOGIES CO., LTD., Guangdong (CN)

(72) Inventors: Ming Zhang, Shenzhen (CN); Lina Lu, Hangzhou (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/170,602

(22) Filed: Oct. 25, 2018

(65) Prior Publication Data

US 2019/0065429 A1    Feb. 28, 2019

Related U.S. Application Data

(63) Continuation of application No. PCT/CN2017/081118, filed on Apr. 19, 2017.

(30) Foreign Application Priority Data

Apr. 29, 2016  (CN) .......................... 201610286786.7

(51) Int. Cl.
*G06F 13/42*  (2006.01)
*G06F 9/455*  (2018.01)
(Continued)

(52) U.S. Cl.
CPC .......... *G06F 13/4221* (2013.01); *G06F 3/067* (2013.01); *G06F 3/0607* (2013.01);
(Continued)

(58) Field of Classification Search
CPC .. G06F 13/4221; G06F 3/0607; G06F 3/0661; G06F 3/0664; G06F 3/067;
(Continued)

(56) References Cited

U.S. PATENT DOCUMENTS 7,089,587 B2 * 8/2006 Allen .................. H04L 63/0442
713/151
7,577,735 B1 * 8/2009 De Groote ............. H04L 45/00
709/224

(Continued)

FOREIGN PATENT DOCUMENTS

CN     101465863 A     6/2009
CN     101557420 A    10/2009
(Continued)

OTHER PUBLICATIONS

M.Tim Jones: Virtual networking in Linux NICs, switches, networks, and appliances, developer works. IBM. Oct. 27, 2010. 8 pages. XP055561276.

*Primary Examiner* — Henry Tsai
*Assistant Examiner* — Aurangzeb Hassan
(74) *Attorney, Agent, or Firm* — Womble Bond Dickinson (US) LLP

(57) ABSTRACT

A data transmission method and an apparatus used in a virtual switch technology are provided. An IO request of a virtual machine VM for accessing a file or a disk is received. When the IO request is to be sent to a physical NIC by using a user mode Open vSwitch (OVS), the IO request is converted into an Internet Small Computer Systems Interface (iSCSI) command in a user mode The iSCSI command is then sent to the user mode OVS. The user mode OVS sends the iSCSI command to the physical NIC.

12 Claims, 6 Drawing Sheets

(51) Int. Cl.
*G06F 3/06* (2006.01)
*H04L 12/931* (2013.01)

(52) U.S. Cl.
CPC .......... *G06F 3/0661* (2013.01); *G06F 3/0664* (2013.01); *G06F 9/455* (2013.01); *G06F 9/45558* (2013.01); *G06F 2009/45579* (2013.01); *G06F 2009/45595* (2013.01); *G06F 2213/0036* (2013.01); *H04L 49/70* (2013.01)

(58) Field of Classification Search
CPC ................ G06F 9/455; G06F 9/45558; G06F 2009/45579; G06F 2009/45595; G06F 2213/0036; H04L 49/70
USPC .......................................................... 710/33
See application file for complete search history.

(56) References Cited

U.S. PATENT DOCUMENTS

| | | | |
|---|---|---|---|
| 7,808,996 B2 * | 10/2010 | Chung | H04L 61/6031 370/392 |
| 8,601,473 B1 | 12/2013 | Aron et al. | |
| 8,719,817 B2 | 5/2014 | Aswani et al. | |
| 9,390,034 B1 * | 7/2016 | Fair | G06F 15/177 |
| 9,571,426 B2 * | 2/2017 | Agarwal | H04L 49/9047 |
| 9,742,881 B2 * | 8/2017 | Chanda | H04L 49/354 |
| 10,270,712 B1 * | 4/2019 | Lippitt | H04L 47/828 |
| 2005/0281261 A1 * | 12/2005 | Zur | H04L 12/4633 370/389 |
| 2005/0281280 A1 * | 12/2005 | Zur | H04L 67/1097 370/419 |
| 2007/0067497 A1 * | 3/2007 | Craft | H04L 67/1097 709/250 |
| 2008/0104589 A1 | 5/2008 | McCrory et al. | |
| 2012/0072669 A1 * | 3/2012 | Nishiguchi | G06F 12/1027 711/135 |
| 2012/0198097 A1 | 8/2012 | Cota-Robles et al. | |
| 2014/0304402 A1 | 10/2014 | Prakash et al. | |
| 2015/0006777 A1 * | 1/2015 | Fair | G06F 9/52 710/200 |
| 2015/0012712 A1 * | 1/2015 | Penner | G06F 12/0862 711/137 |
| 2016/0328272 A1 * | 11/2016 | Ahmed | G06F 9/4881 |
| 2017/0109176 A1 * | 4/2017 | Shih | G06F 9/4416 |
| 2018/0136957 A1 * | 5/2018 | Guo | H04L 63/0428 |

FOREIGN PATENT DOCUMENTS

| | | |
|---|---|---|
| CN | 102073556 A | 5/2011 |
| CN | 102497434 A | 6/2012 |
| CN | 102662910 A | 9/2012 |
| CN | 104104705 A | 10/2014 |
| CN | 104601468 A | 5/2015 |
| CN | 106020926 A | 10/2016 |

* cited by examiner

DATA TRANSMISSION METHOD AND APPARATUS USED IN VIRTUAL SWITCH TECHNOLOGY

CROSS-REFERENCE TO RELATED APPLICATIONS

This application is a continuation of International Application No. PCT/CN2017/081118, filed on Apr. 19, 2017, which claims priority to Chinese Patent Application No. 201610286786.7, filed on Apr. 29, 2016. The disclosures of the aforementioned applications are hereby incorporated by reference in their entireties.

TECHNICAL FIELD

Embodiments of the invention relate to the field of communications technologies, and in particular, to a data transmission method and an apparatus used in a virtual switch technology.

BACKGROUND

A virtual switch is mainly applied to a server virtualization scenario, and mainly implements two functions: Function 1: transferring network traffic between virtual machines (VM); and Function 2: implementing communication between a VM and an external network.

In a Linux implementation, operation space is divided into two parts: user mode operation space and kernel mode operation space. A user mode Open vSwitch (OVS) is a switch whose data plane forwarding function is implemented in the Linux user mode operation space, and the user mode OVS is connected to a physical network interface controller (NIC) by using a Data Plane Development Kit (DPDK) as a data channel. In addition, the user mode OVS shares a management platform with a kernel mode OVS. A rate limiting function is set for the user mode OVS to implement network adapter rate limiting, so as to provide a solution of a high-performance virtual switch for a virtualization scenario.

The DPDK is a set of libraries and drivers for fast packet processing. A Linux kernel interrupt mechanism that operates in Linux user space cannot meet a performance requirement of a network adapter with a high throughput (for example, 40 Gigabits Ethernet (GE)). Intel puts forward the DPDK to resolve this problem, and network adapter rate limiting may be achieved by using the DPDK.

In an existing user mode OVS solution, a path of processing an IO request by a virtual machine is shown in FIG. 1. A virtual disk service process receives an IO request sent by the virtual machine, and places the IO request in a storage stack. The storage stack converts the IO request into an IO packet and submits the IO packet to an IO protocol stack. Then the IO protocol stack transfers the IO packet to the user mode OVS by using a socket mechanism. Finally, the user mode OVS sends the packet by using the DPDK and the physical NIC.

In a process of forwarding the IO packet by using the user mode OVS, the IO packet needs to be switched from the user mode OVS to a kernel mode, and then be switched from the kernel mode to the user mode. Therefore, context switching is required. In addition, to forward the IO packet from the user mode to the storage stack of the kernel mode, the IO packet needs to be copied. Consequently, in the prior art, performance of a virtual machine of the user mode OVS for processing the IO request is relatively low.

SUMMARY

Embodiments of the invention provide a data transmission method and an apparatus used in a virtual switch technology. The method and apparatus provided by embodiments of the invention resolve a prior-art problem that performance of a virtual machine of a user mode OVS for processing an IO request is relatively low.

According to one embodiment, a data transmission method used in a virtual switch technology is provided, and the method includes: receiving an IO request sent by a virtual machine VM, and determining whether the IO request needs to be sent to a physical NIC by using a user mode Open vSwitch OVS, where the user mode OVS implements network interworking between virtual machines on a same host or virtual machines on different hosts; and if the IO request needs to be sent to the physical NIC by using the user mode OVS, converting the IO request into an Internet Small Computer Systems Interface iSCSI command in a user mode, and then sending the iSCSI command to the user mode OVS, so as to send the iSCSI command to the physical NIC by using the user mode OVS.

In an embodiment, when processing the IO request, the virtual machine determines whether the IO request is forwarded by using the user mode OVS, and if the IO request is forwarded by using the user mode OVS, the virtual machine directly converts, in the user mode, the IO request into a format that can be processed by the user mode OVS and then sends the IO request to the user mode OVS for processing. This can avoid context switching during IO request forwarding in the prior art. Therefore, performance of the virtual machine for processing the IO request can be effectively improved.

In one embodiment, in a possible design, the converting the IO request into an Internet Small Computer Systems Interface iSCSI command includes: converting the IO request into a Small Computer System Interface SCSI command; and adding an Internet Small Computer Systems Interface iSCSI header to the SCSI command to obtain the iSCSI command.

Optionally, to implement classification of IO requests, an IO request that needs to be sent by using the user mode OVS is separated from the IO requests. The determining whether the IO request needs to be sent to a physical NIC by using a user mode OVS includes:

determining disk information of a disk to be accessed by the IO request or a disk in which a file to be accessed by the IO request is located, determining, according to the disk information, whether the disk to be accessed by the IO request is a disk of a remote terminal, and if the disk to be accessed by the IO request is the disk of the remote terminal, determining that the IO request needs to be sent to the physical NIC by using the user mode OVS.

According to one embodiment, based on an IO request sending process in the first aspect, a data transmission method used in a virtual switch technology is provided in the second aspect. The method implements processing of a response to an IO request, and the method specifically includes: receiving an Internet Small Computer Systems Interface iSCSI packet returned by a physical NIC in response to an IO request, where the iSCSI packet needs to be sent, by using a user mode Open vSwitch OVS, to a virtual machine that initiates the IO request, and the user mode OVS implements network interworking between virtual machines on a same host or virtual machines on different hosts; and converting the iSCSI packet into an IO response in a user mode, and then sending the IO response to the virtual machine that initiates the IO request.

In one embodiment, in a possible design, the converting the iSCSI packet into an IO response in a user mode, and then sending the IO response to the virtual machine that initiates the IO request includes:

converting the iSCSI packet into an SCSI response; and converting the SCSI response into the IO response, and sending the IO response to the virtual machine that initiates the IO request.

In one embodiment, the method is an IO request initiation process. In one embodiment, the method is a process of processing the response to the IO request. In one embodiment, a specific effect of the method provided in one embodiment is the same as that of the method provided in the another embodiment.

According to one embodiment, an electronic device is provided, and the electronic device includes:

a determining module, configured to: receive an IO request sent by a virtual machine VM, and determine whether the IO request needs to be sent to a physical NIC by using a user mode Open vSwitch OVS, where the user mode OVS implements network interworking between virtual machines on a same host or virtual machines on different hosts; and a conversion module, configured to: if the IO request needs to be sent to the physical NIC by using the user mode OVS, convert the IO request into an Internet Small Computer Systems Interface iSCSI command in a user mode, and then send the iSCSI command to the user mode OVS, so as to send the iSCSI command to the physical NIC by using the user mode OVS.

In one embodiment, in a possible design, the determining module is specifically configured to: determine disk information of a disk to be accessed by the IO request or a disk in which a file to be accessed by the IO request is located; determine, according to the disk information, whether the disk to be accessed by the IO request is a disk of a remote terminal; and if the disk to be accessed by the IO request is the disk of the remote terminal, determine that the IO request needs to be sent to the physical NIC by using the user mode OVS.

In one embodiment, in a possible design, the conversion module is specifically configured to: convert the IO request into a Small Computer System Interface SCSI command, and add an Internet Small Computer Systems Interface iSCSI header to the SCSI command to obtain the iSCSI command.

According to one embodiment, an electronic device is provided, including:

a receiving module, configured to: receive an Internet Small Computer Systems Interface iSCSI packet returned by a physical NIC in response to an IO request, where the iSCSI packet needs to be sent, by using a user mode Open vSwitch OVS, to a virtual machine that initiates the IO request, and the user mode OVS implements network interworking between virtual machines on a same host or virtual machines on different hosts; and a conversion module, configured to: convert the iSCSI packet into an IO response in a user mode, and then send the IO response to the virtual machine that initiates the IO request.

In a possible design, the conversion module is specifically configured to: convert the iSCSI packet into an SCSI response, convert the SCSI response into the IO response, and send the IO response to the virtual machine that initiates the IO request.

According to one embodiment, a computer readable storage medium is provided. The readable storage medium stores program code that implements the data transmission method used in the virtual switch technology described in the first aspect. The program code includes an execution instruction for operating the data transmission method used in the virtual switch technology described in the first aspect.

According to one embodiment, a computer readable storage medium is provided. The readable storage medium stores program code that implements the data transmission method used in the virtual switch technology described in the second aspect. The program code includes an execution instruction for operating the data transmission method used in the virtual switch technology described in the second aspect.

According to an embodiment of the invention a computer storage medium is provided that is configured to store a computer software instruction used by the base station, and the computer storage medium includes a program designed to execute the foregoing embodiments.

According to one embodiment, an electronic device is provided, and the electronic device includes a virtual machine, a hypervisor, and a hardware layer. A network interface device may be specifically a physical NIC.

The hypervisor may operate in two modes: a user mode and a kernel mode. In an embodiment, to improve a capability of processing an IO request by the virtual machine, the hypervisor is specifically configured to:

receive an IO request sent by the virtual machine VM, and determine whether the IO request needs to be sent to the physical NIC by using a user mode Open vSwitch OVS, where the user mode OVS implements network interworking between virtual machines on a same host or virtual machines on different hosts; and if the IO request needs to be sent to the physical NIC by using the user mode OVS, convert the IO request into an Internet Small Computer Systems Interface iSCSI command in a user mode, and then send the iSCSI command to the user mode OVS, so as to send the iSCSI command to the physical NIC by using the user mode OVS.

In another embodiment, the hypervisor is configured to: determine disk information of a disk to be accessed by the IO request or a disk in which a file to be accessed by the IO request is located; determine, according to the disk information, whether the disk to be accessed by the IO request is a disk of a remote terminal; and if the disk to be accessed by the IO request is the disk of the remote terminal, determine that the IO request needs to be sent to the physical NIC by using the user mode OVS.

In another embodiment, the hypervisor is configured to: convert the IO request into a Small Computer System Interface SCSI command, and add an Internet Small Computer Systems Interface iSCSI header to the SCSI command to obtain the iSCSI command.

In one embodiment, a specific implementation of a response to an IO request is the same as that of a structure of the electronic device in the foregoing instance, but the hypervisor 320 processes, in a different manner, a response fed back by the physical NIC. The hypervisor is configured to: receive an Internet Small Computer Systems Interface iSCSI packet returned by the physical NIC in response to an IO request; and convert the iSCSI packet into an IO response in a user mode, and then send the IO response to a virtual machine that initiates the IO request, where the iSCSI packet needs to be sent, by using a user mode Open vSwitch OVS, to the virtual machine that initiates the IO request, and the user mode OVS implements network interworking between virtual machines on a same host or virtual machines on different hosts.

In another embodiment, the hypervisor is configured to: convert the iSCSI packet into an SCSI response, convert the SCSI response into the IO response, and send the IO response to the virtual machine that initiates the IO request.

One or two of the foregoing technical solutions have at least the following technical effects:

According to the method and apparatus provided in the embodiments of the invention, the IO request that needs to be sent to the physical NIC by using the user mode OVS is directly converted, in the user mode, into a format that can be processed by the user mode OVS, and then is sent to the user mode OVS. This avoids a process of switching the IO request from the user mode to the kernel mode, and then from the kernel mode to the user mode. Therefore, the performance of the virtual machine for processing the IO request can be effectively improved.

DESCRIPTION OF EMBODIMENTS

To make the objectives, technical solutions, and advantages of the embodiments of the invention clearer, the following describes the technical solutions in the embodiments of the invention with reference to the accompanying drawings in the embodiments of the invention. Apparently, the described embodiments are a part rather than all of the embodiments of the invention. All other embodiments obtained by a person of ordinary skill in the art based on the embodiments of the invention shall fall within the protection scope of embodiments of the invention.

In an existing user mode OVS solution, performance of a virtual machine for processing an IO request is relatively low. Main reasons for this problem include: A: After the IO request is sent from a virtual disk service process (tapdisk2), context switching is performed twice (that is, the IO request is switched from a user mode to a kernel mode, and then switched from the kernel mode to the user mode); B: In a process of forwarding the IO request, a packet splitting operation is required from a storage stack to a user mode OVS; and C: When the virtual machine processes the IO request by using a procedure shown in FIG. 1, quality of service (Quality of Service, QoS) control is performed twice. QoS control is performed in the storage stack, and the user mode OVS also has a QoS control capability. Consequently, the performance of the virtual machine for processing the IO request is affected to some extent.

Based on the foregoing reasons, in the solutions provided in the embodiments of the invention, if an IO request needs to be sent to a physical NIC by using the user mode OVS, the IO request is directly converted, in the user mode, into a format that can be processed by the user mode OVS, and then is sent to the user mode OVS. This avoids a process of switching the IO request from the user mode to the kernel mode, and then from the kernel mode to the user mode, and further avoids the foregoing problems. Therefore, the performance of the virtual machine for processing the IO request can be effectively improved. For a specific implementation, refer to the following instances:

Embodiment 1

Figure 2:
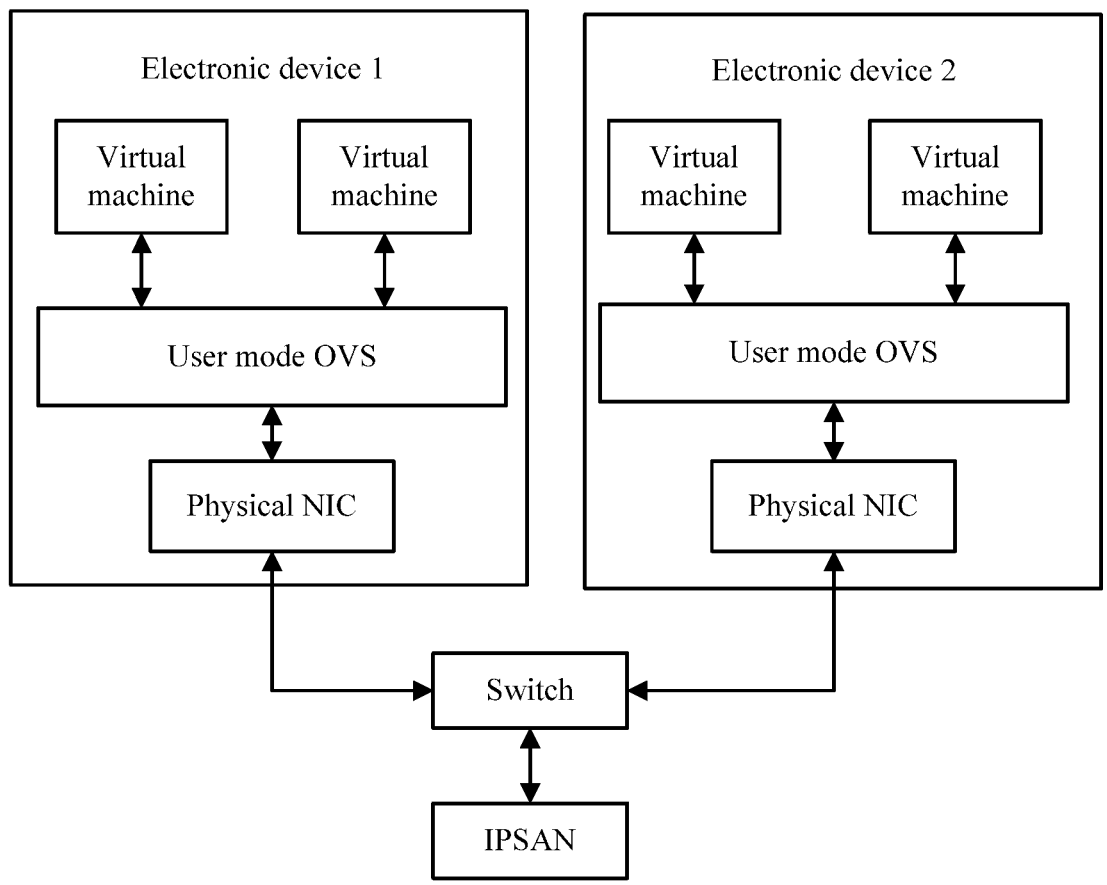
FIG. 2 is a schematic structural diagram of a system for implementing a server virtualization scenario used in an embodiment of the invention.
Figure 3:
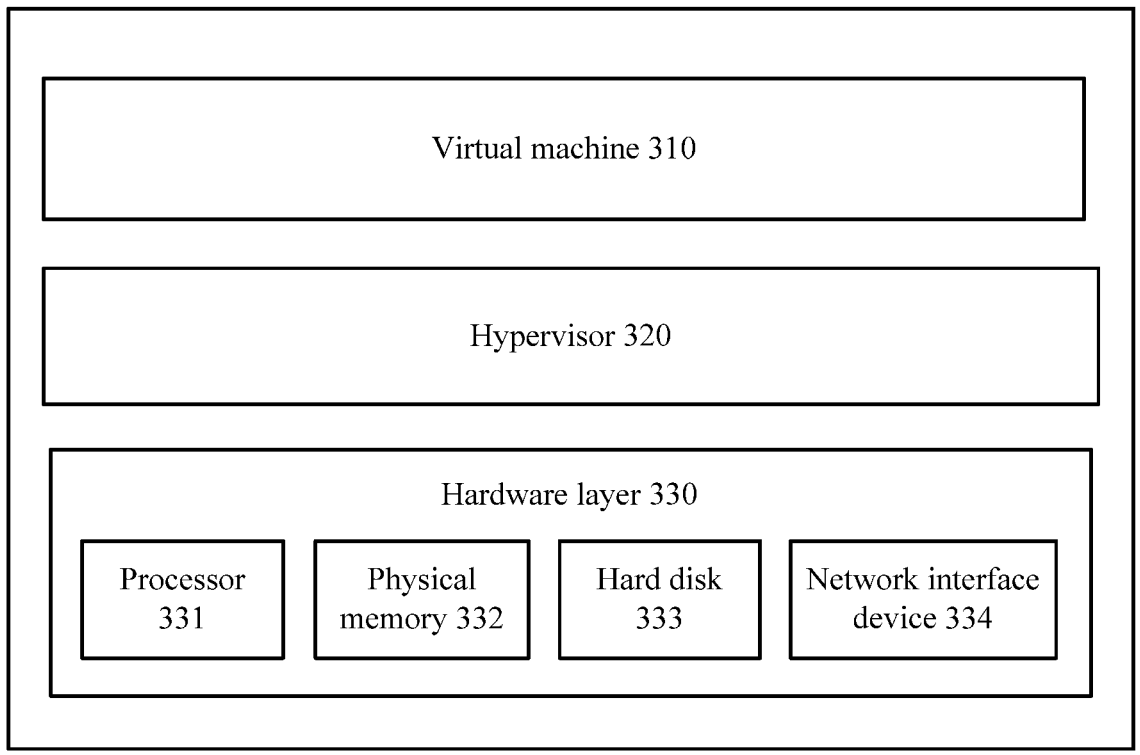
FIG. 3 is a schematic structural diagram of an electronic device according to an embodiment of the invention.

A structure of a system for implementing a server virtualization scenario in an embodiment of the invention is shown in FIG. 2. A user mode OVS implements network interworking between virtual switches, including virtual machines on a same host and virtual machines on different hosts. A virtual disk file of a virtual machine is stored on an Internet Protocol Storage Area Network (IPSAN) device that is connected to the virtual machine by using a network. An IO request processed by the virtual machine is sent to the IPSAN device by using the user mode OVS, to implement virtual storage and access. Based on the system structure shown in FIG. 2, the embodiments of the invention provide an electronic device, and a specific implementation of the electronic device may be as follows:

As shown in FIG. 3, an embodiment of the invention provides an electronic device, and the electronic device includes a virtual machine 310, a hypervisor 320, and a hardware layer 330. The virtual machine 310 is constructed based on the hardware layer 330, and the hypervisor 320 implements data monitoring and transmission between the virtual machine 310 and the hardware layer 330. The hardware layer 330 includes a processor 331, a physical memory 332, a hard disk 333, a network interface device 334, and the like. The network interface device 334 may be specifically a physical NIC.

The hypervisor 320 may operate in two modes: a user mode and a kernel mode. In an embodiment, to improve a capability of the virtual machine for processing an IO request, the hypervisor 320 is specifically configured to:

receive an IO request sent by the virtual machine VM, and determine whether the IO request needs to be sent to the physical NIC (in an embodiment, the physical NIC may be one of the network interface device 334 in FIG. 3) by using a user mode Open vSwitch OVS, where the user mode OVS implements network interworking between virtual machines on a same host or virtual machines on different hosts; and if the IO request needs to be sent to the physical NIC by using the user mode OVS, convert the IO request into an Internet Small Computer Systems Interface (iSCSI) command in a user mode, and then send the iSCSI command to the user mode OVS, so as to send the iSCSI command to the physical NIC by using the user mode OVS.

Optionally, a specific implementation of determining, by the hypervisor 320, whether the IO request is to be sent to the physical NIC by using the user mode OVS is:

determining disk information of a disk to be accessed by the IO request or a disk in which a file to be accessed by the IO request is located; determining, according to the disk information, whether the disk to be accessed by the IO request is a disk of a remote terminal; and if the disk to be accessed by the IO request is the disk of the remote terminal, determining that the IO request needs to be sent to the physical NIC by using the user mode OVS.

Optionally, that the hypervisor 320 converts the IO request into the Internet Small Computer Systems Interface iSCSI command includes:

converting the IO request into a Small Computer System Interface SCSI command; and adding an Internet Small Computer Systems Interface iSCSI header to the SCSI command to obtain the iSCSI command.

A specific implementation of a response to the IO request is the same as that of a structure of the electronic device in the foregoing instance, but the hypervisor 320 processes, in a different manner, a response fed back by the physical NIC. Therefore, based on the structure shown in FIG. 3, the specific implementation of the response to the IO request may be as follows:

The hypervisor 320 is configured to: receive an Internet Small Computer Systems Interface iSCSI packet returned by the physical NIC in response to the IO request; and convert the iSCSI packet into an IO response in the user mode, and then send the IO response to the virtual machine that initiates the IO request, where the iSCSI packet needs to be sent, by using the user mode Open vSwitch OVS, to the virtual machine that initiates the IO request, and the user mode OVS implements network interworking between virtual machines on a same host or virtual machines on different hosts.

Optionally, a specific implementation of converting, by the hypervisor 320, the iSCSI packet into the IO response in the user mode, and then sending the IO response to the virtual machine that initiates the IO request includes:

converting the iSCSI packet into an SCSI response; and converting the SCSI response into the IO response, and sending the IO response to the virtual machine that initiates the IO request.

In the solution provided in an embodiment of the invention, if the IO request needs to be sent to the physical NIC by using the user mode OVS, the IO request is directly converted, in the user mode, into a format that can be processed by the user mode OVS, and then is sent to the user mode OVS. This avoids a process of switching the IO request from the user mode to the kernel mode, and then from the kernel mode to the user mode, thereby avoiding a prior-art problem that performance of a virtual machine of the user mode OVS for processing the IO request is relatively low. Therefore, the performance of the virtual machine for processing the IO request can be effectively improved.

Embodiment 2

Figure 4:
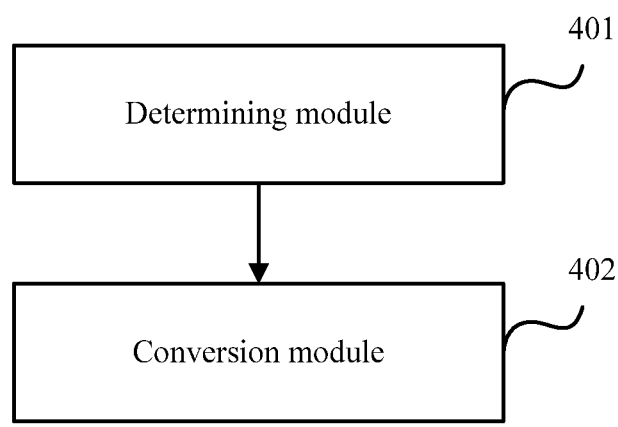
FIG. 4 is a schematic structural diagram of another electronic device according to an embodiment of the invention.

As shown in FIG. 4, an embodiment of the invention provides an electronic device, and the electronic device may specifically include a determining module 401 and a conversion module 402.

The determining module 401 is configured to: receive an IO request sent by a virtual machine VM, and determine whether the IO request needs to be sent to a physical NIC by using a user mode Open vSwitch OVS, where the user mode OVS implements network interworking between virtual machines on a same host or virtual machines on different hosts.

Optionally, when the determining module 401 determines whether the IO request needs to be sent to the physical NIC by using the user mode OVS, a specific implementation may be as follows:

The determining module 401 is specifically configured to: determine disk information of a disk to be accessed by the IO request or a disk in which a file to be accessed by the IO request is located; determine, according to the disk information, whether the disk to be accessed by the IO request is a disk of a remote terminal; and if the disk to be accessed by the IO request is the disk of the remote terminal, determine that the IO request needs to be sent to the physical NIC by using the user mode OVS.

The conversion module 402 is configured to: if that the IO request needs to be sent to the physical NIC by using the user mode OVS, convert the IO request into an Internet Small Computer Systems Interface iSCSI command in a user mode, and then send the iSCSI command to the user mode OVS, so as to send the iSCSI command to the physical NIC by using the user mode OVS.

Optionally, the conversion module 402 is specifically configured to: convert the IO request into a Small Computer System Interface SCSI command, and add an Internet Small Computer Systems Interface iSCSI header to the SCSI command to obtain the iSCSI command.

Embodiment 3

Figure 5:
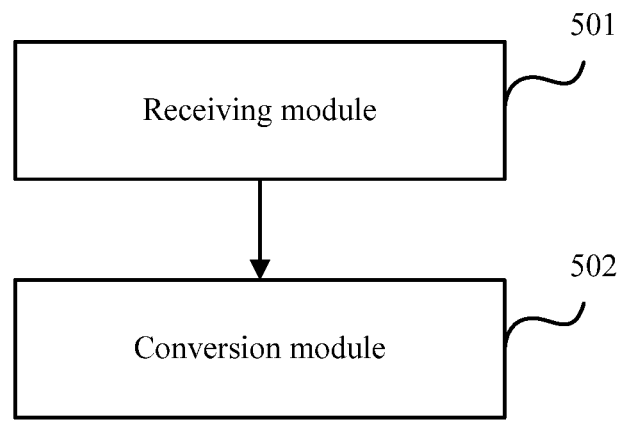
FIG. 5 is a schematic structural diagram of another electronic device according to an embodiment of the invention.

As shown in FIG. 5, an embodiment of the invention provides an electronic device, and a specific implementation of the electronic device includes:

a receiving module 501, configured to: receive an Internet Small Computer Systems Interface iSCSI packet returned by a physical NIC in response to an IO request, where the iSCSI packet needs to be sent, by using a user mode Open vSwitch OVS, to a virtual machine that initiates the IO request, and the user mode OVS implements network interworking between virtual machines on a same host or virtual machines on different hosts; and a conversion module 502, configured to: convert the iSCSI packet into an IO response in a user mode, and then send the IO response to the virtual machine that initiates the IO request.

Optionally, a specific implementation of converting the iSCSI packet into the IO response may be as follows:

The conversion module 502 is specifically configured to: convert the iSCSI packet into an SCSI response, convert the SCSI response into the IO response, and send the IO response to the virtual machine that initiates the IO request.

Embodiment 4

Figure 6:
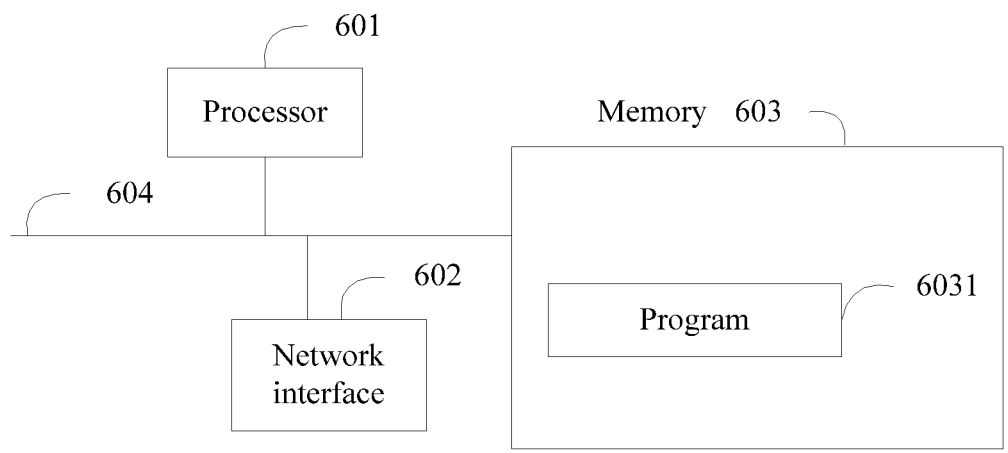
FIG. 6 is a schematic structural diagram of another electronic device according to an embodiment of the invention.

As shown in FIG. 6, an embodiment of the invention further provides another electronic device, configured to execute a data transmission method in a virtual switch technology in the foregoing embodiments. The electronic device includes at least one processor 601 (for example, a CPU), at least one network interface 602 or another communications interface, a memory 603, and at least one communications bus 604 that is configured to implement connection and communication between these apparatuses. The processor 601 is configured to execute an executable module stored in the memory 603, for example, a computer program. The memory 603 may include a high-speed Random Access Memory (RAM), and may further include a nonvolatile memory, for example, at least one magnetic disk storage. The at least one network interface 602 (which may be wired or wireless) may implement a communicative connection between the system gateway and at least one other network element by using the Internet, a wide area network, a local network, a metropolitan area network, or the like.

In some implementations, the memory stores a program 6031, the program may be executed by the processor, and the program includes:

receiving an IO request sent by a virtual machine VM, and determining whether the IO request needs to be sent to a physical NIC by using a user mode Open vSwitch OVS, where the user mode OVS implements network interworking between virtual machines on a same host or virtual machines on different hosts; and if that the IO request needs to be sent to the physical NIC by using the user mode OVS, converting the IO request into an Internet Small Computer Systems Interface iSCSI command in a user mode, and then sending the iSCSI command to the user mode OVS, so as to send the iSCSI command to the physical NIC by using the user mode OVS.

Optionally, the determining whether the IO request needs to be sent to a physical NIC by using a user mode OVS includes:

determining disk information of a disk to be accessed by the IO request or a disk in which a file to be accessed by the IO request is located, determining, according to the disk information, whether the disk to be accessed by the IO request is a disk of a remote terminal, and if the disk to be accessed by the IO request is the disk of the remote terminal, determining that the IO request needs to be sent to the physical NIC by using the user mode OVS.

Optionally, the converting the IO request into an Internet Small Computer Systems Interface iSCSI command includes:

converting the IO request into a Small Computer System Interface SCSI command; and adding an Internet Small Computer Systems Interface iSCSI header to the SCSI command to obtain the iSCSI command.

Based on a structure shown in FIG. 6, to process a response that is to the IO request and that is returned by the physical NIC, correspondingly, the program 6031 stored by the memory further includes:

receiving an Internet Small Computer Systems Interface iSCSI packet returned by the physical NIC in response to the IO request, where the iSCSI packet needs to be sent, by using the user mode Open vSwitch OVS, to the virtual machine that initiates the IO request, and the user mode OVS implements network interworking between virtual machines on a same host or virtual machines on different hosts; and converting the iSCSI packet into an IO response in the user mode, and then sending the IO response to the virtual machine that initiates the IO request.

Optionally, the converting the iSCSI packet into an IO response in the user mode, and then sending the IO response to the virtual machine that initiates the IO request includes:

converting the iSCSI packet into an SCSI response; and converting the SCSI response into the IO response, and sending the IO response to the virtual machine that initiates the IO request.

Embodiment 5

Figure 7:
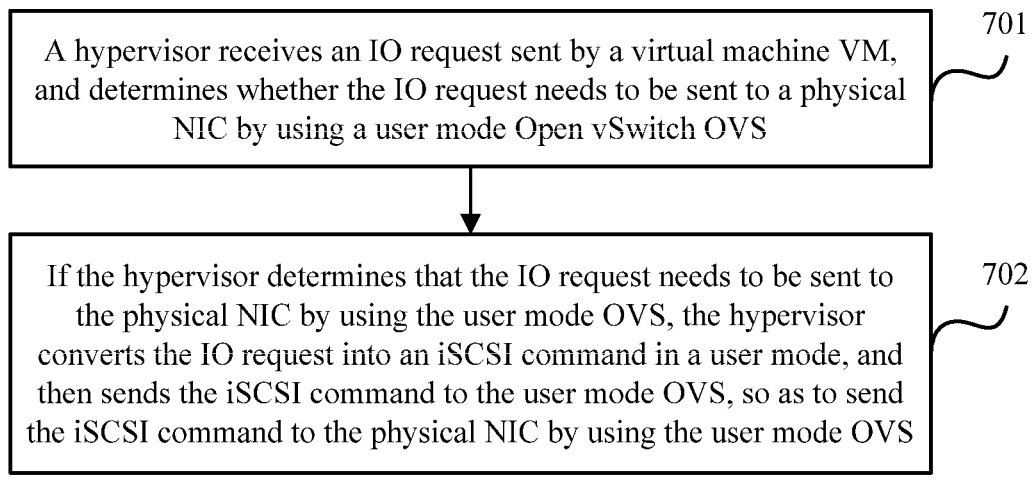
FIG. 7 is a flowchart of a data transmission method used in a virtual switch technology according to an embodiment of the invention.

Based on apparatus structures provided in the foregoing embodiments, an embodiment of the invention provides a data transmission method used in a virtual switch technology. The method specifically includes the following operations (an implementation procedure is shown in FIG. 7).

The method provided in an embodiment of the invention may be implemented based on the apparatus structures shown in FIG. 3, FIG. 4, and FIG. 6. Different apparatuses execute the method in an embodiment of the invention by using different specific function modules. For a specific function module that implements the method according to an embodiment of the invention, reference may be made to specific descriptions of different apparatuses in Embodiment 1 to Embodiment 4. For ease of description, with reference to Embodiment 3, the following describes in detail the data transmission method used in the virtual switch technology provided in an embodiment of the invention.

Operation 701: A hypervisor receives an IO request sent by a virtual machine VM, and determines whether the IO request needs to be sent to a physical NIC by using a user mode Open vSwitch OVS, where the user mode OVS implements network interworking between virtual machines on a same host or virtual machines on different hosts.

Optionally, the determining whether the IO request needs to be sent to a physical NIC by using a user mode OVS includes:

determining disk information of a disk to be accessed by the IO request or a disk in which a file to be accessed by the IO request is located, determining, according to the disk information, whether the disk to be accessed by the IO request is a disk of a remote terminal, and if the disk to be accessed by the IO request is the disk of the remote terminal, determining that the IO request needs to be sent to the physical NIC by using the user mode OVS.

Based on the system structure shown in FIG. 2, the remote terminal may be a device that is connected, by using a switch, to an electronic device that implements the method in the embodiment of the invention.

In an embodiment, if it is determined, according to the disk information, that the IO request is to access a local device disk, the IO request is directly forwarded to the physical NIC by using a kernel mode.

Operation 702: If the hypervisor determines that the IO request needs to be sent to the physical NIC by using the user mode OVS, the hypervisor converts the IO request into an iSCSI command in a user mode, and then sends the iSCSI command to the user mode OVS, so as to send the iSCSI command to the physical NIC by using the user mode OVS.

To ensure that the IO request can be transmitted on a network, when the IO request is transmitted on different hosts, the IO request needs to be converted into the iSCSI command, and then the packet is converted into the IO request on a target server. In an embodiment, to convert an IO request sent by tapdisk2 into an iSCSI command that can be identified by the user mode OVS, in a solution provided in an embodiment, the IO request may be converted in the user mode.

a1. Convert the IO request into a Small Computer System Interface (SCSI) command.

Specifically, major and minor device numbers (which include an ID of a storage block device that initiates accessing and an ID of a storage block device that needs to be accessed by the IO request), a first sector, a request size, and whether the request is a request for a read operation or a request for a write operation that are corresponding to the IO request are obtained from the IO request.

A specific implementation of converting the IO request into the SCSI command may be that the ID of the storage block device that needs to be accessed by the IO request is converted into a logical unit number (LUN) of a destination host in the corresponding SCSI command, the first sector needs to be converted into a physical disk address, the read operation or the write operation needs to be converted into an SCSI operation direction, and after the foregoing conversion is implemented, the content obtained after conversion is encapsulated into the SCSI command.

a2. Convert the SCSI command into the iSCSI command. A specific implementation is:

adding an iSCSI header to the SCSI command, where the iSCSI header is encapsulated according to an iSCSI protocol, and the iSCSI header includes a basic header segment (BHS), an additional header segment (AHS), a header-digest, a data-digest, and the like.

Figure 1:
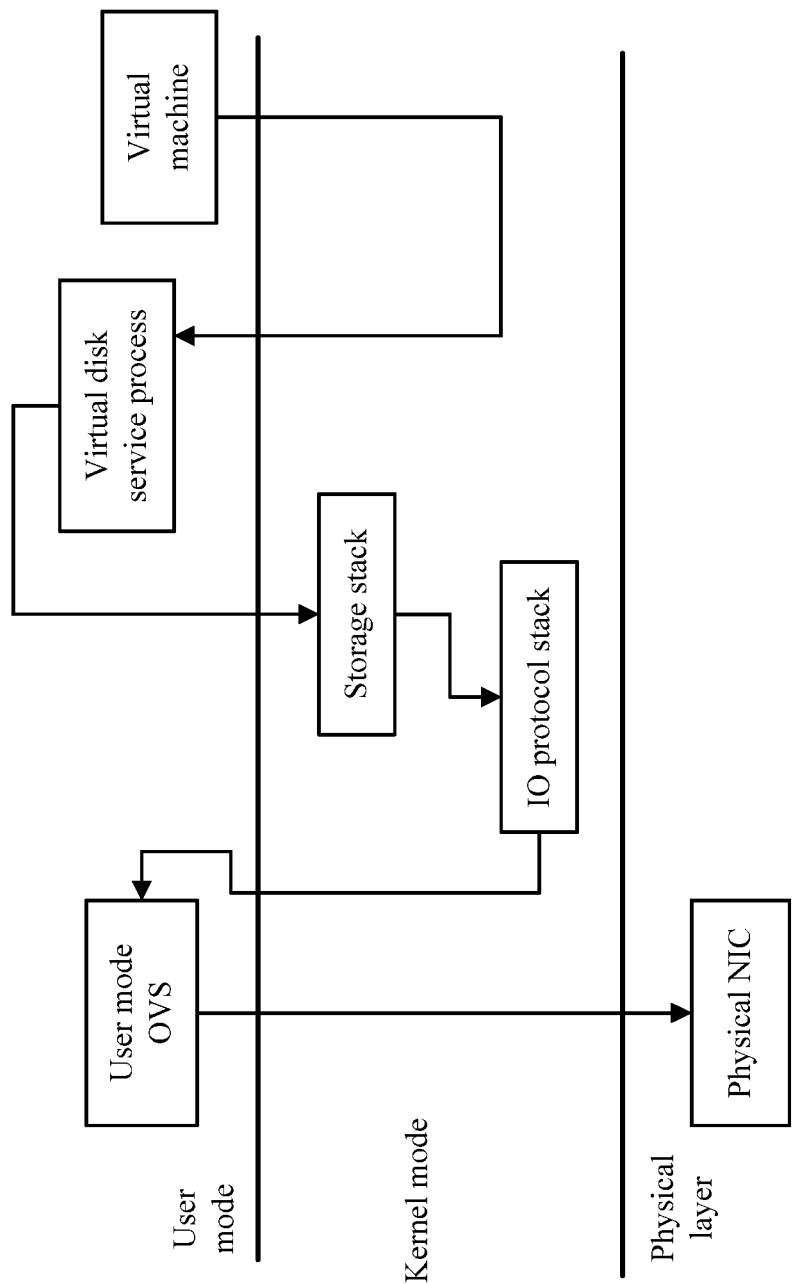
FIG. 1 is a schematic diagram of a path for processing an IO request by a virtual machine in an existing user mode OVS solution.

Different from the IO request sending path shown in FIG. 1, in the method provided in an embodiment of the invention, an IO request sent by a virtual disk service may be directly sent to the user mode OVS in the user mode. A specific schematic diagram may be shown in FIG. 8.

According to the method provided in an embodiment of the invention, the IO request that needs to be sent to the physical NIC by using the user mode OVS is directly converted, in the user mode, into a format that can be processed by the user mode OVS, and then is sent to the user mode OVS. This avoids a process of switching the IO request from the user mode to the kernel mode, and then from the kernel mode to the user mode. Therefore, performance of the virtual machine for processing the IO request can be effectively improved.

Embodiment 6

Figure 9:
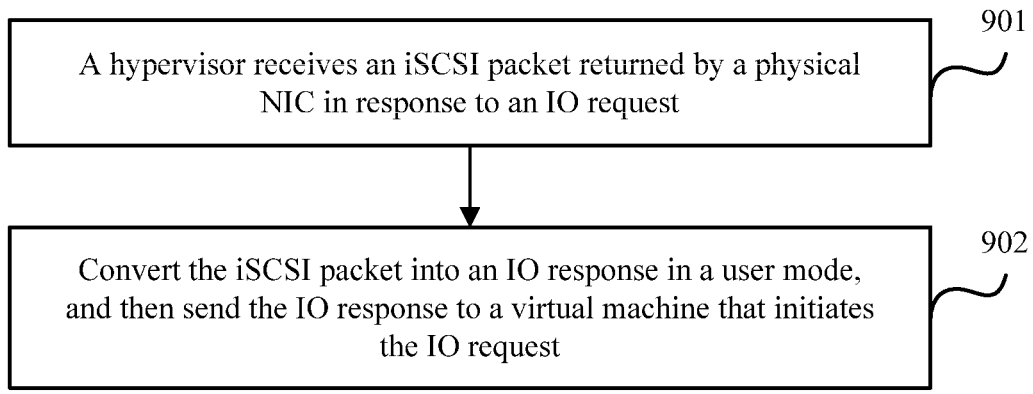
FIG. 9 is a schematic flowchart of another data transmission method used in a virtual switch technology according to an embodiment of the invention.
Figure 10:
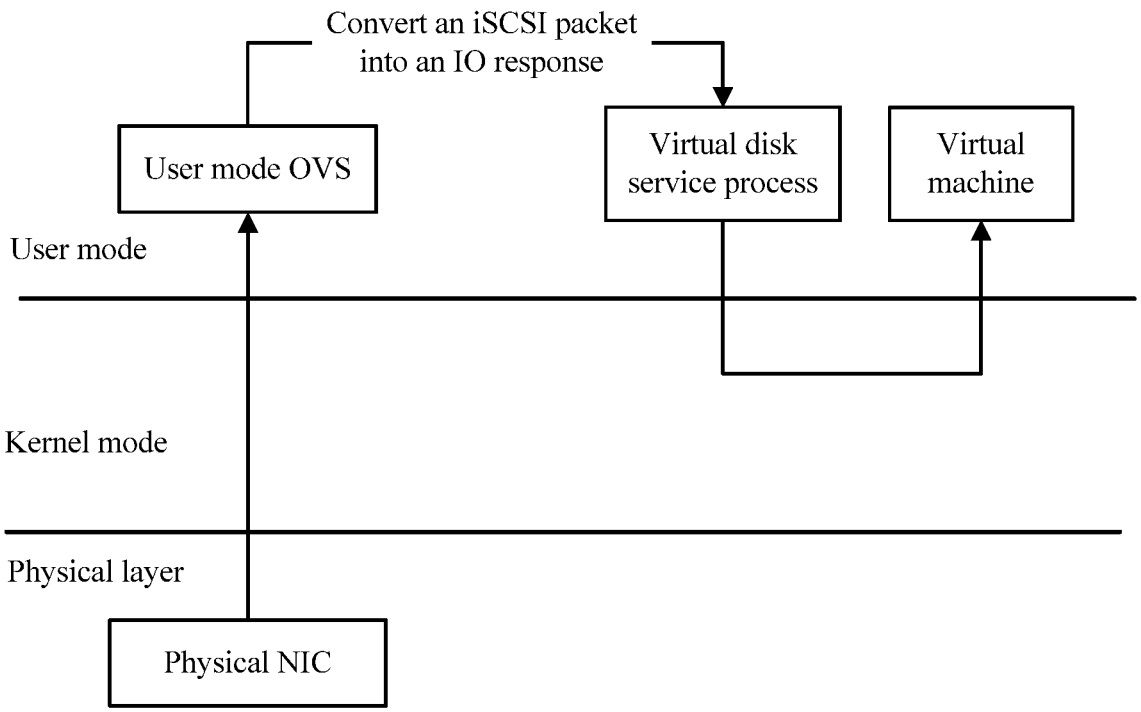
FIG. 10 is a schematic diagram of a path for processing an IO request by a virtual machine according to an embodiment of the invention.

As shown in FIG. 9, an embodiment of the invention further provides a data transmission method used in a virtual switch technology. The method specifically includes the following operations.

The method provided in an embodiment of the invention may be implemented based on the apparatus structures shown in FIG. 3, FIG. 5, and FIG. 6. Different apparatuses execute the method in an embodiment of the invention by using different specific function modules. For a specific function module that implements the method according to an embodiment of the invention, reference may be made to specific descriptions of different apparatuses in Embodiment 1 to Embodiment 4. For ease of description, with reference to Embodiment 3, the following describes in detail the data transmission method used in the virtual switch technology provided in an embodiment of the invention.

Operation 901: A hypervisor receives an iSCSI packet returned by a physical NIC in response to an IO request, where the iSCSI packet needs to be sent, by using a user mode Open vSwitch OVS, to a virtual machine that initiates the IO request, and the user mode OVS implements network interworking between virtual machines on a same host or virtual machines on different hosts.

Operation 902: Convert the iSCSI packet into an IO response in a user mode, and then send the IO response to the virtual machine that initiates the IO request.

In an embodiment, the converting the iSCSI packet into an IO response in a user mode, and then sending the IO response to the virtual machine that initiates the IO request includes:

converting the iSCSI packet into an SCSI response; and converting the SCSI response into the IO response, and sending the IO response to the virtual machine that initiates the IO request.

The method provided in an embodiment is a procedure in response to the IO request. A solution of an embodiment may be independently implemented, or may be combined with the method provided in Embodiment 1. When the method in an embodiment and the method in Embodiment 1 are combined, a complete process of initiating the IO request and responding to the request may be implemented.

Figure 8:
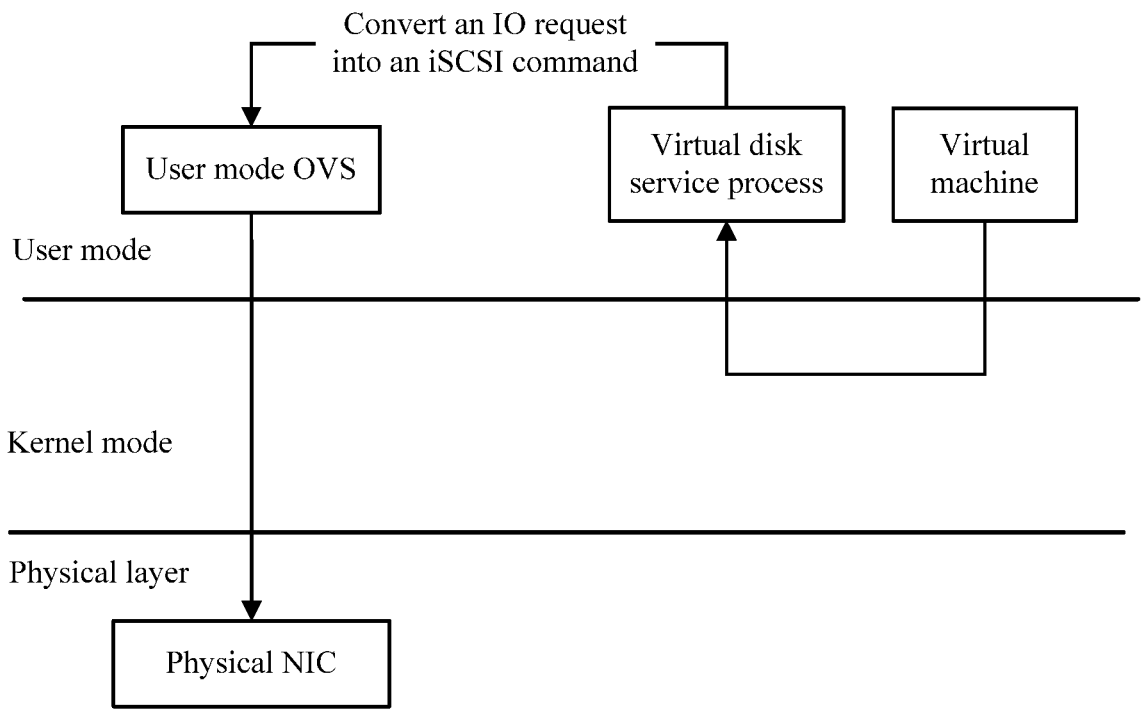
FIG. 8 is a schematic flowchart of a data transmission method used in a virtual switch technology according to an embodiment of the invention.

Different from the IO request sending path shown in FIG. 8, in the method provided in an embodiment of the invention, an electronic device processes a response to an IO request, and a specific schematic diagram may be shown in FIG. IO.

In the method provided in an embodiment of the invention, when processing the response to the IO request, the electronic device directly processes and converts a returned packet in the user mode without context switching, thereby shortening a response processing procedure, and effectively improving performance of the virtual machine for processing the IO request.

The foregoing one or more technical solutions in the embodiments of this application have at least the following technical effects:

In the solutions provided in the embodiments of the invention, if the IO request needs to be sent to the physical NIC by using the user mode OVS, the IO request is directly converted, in the user mode, into a format that can be processed by the user mode OVS, and then is sent to the user mode OVS. This avoids a process of switching the IO request from the user mode to the kernel mode, and then from the kernel mode to the user mode, thereby avoiding a prior-art problem that performance of a virtual machine of the user mode OVS for processing the IO request is relatively low. Therefore, the performance of the virtual machine for processing the IO request can be effectively improved.

The embodiments in this specification are all described in a progressive manner, for same or similar parts in the embodiments, reference may be made to these embodiments, and each embodiment focuses on a difference from other embodiments. Especially, an apparatus embodiment is basically similar to a method embodiment, and therefore is described briefly; for related parts, reference may be made to partial descriptions in the method embodiment. The described apparatus embodiment is merely an example. The units described as separate parts may or may not be physically separate, and parts displayed as units may or may not be physical units, may be located in one position, or may be distributed on a plurality of network units. Some or all the modules may be selected according to actual needs to achieve the objectives of the solutions of the embodiments. A person of ordinary skill in the art may understand and implement the embodiments of the invention as described herein.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of embodiments of the invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the invention may be integrated into one processing unit, or each of the units may exist alone physically, or two or more units are integrated into one unit.

When the functions are implemented in the form of a software functional unit and sold or used as an independent product, the functions may be stored in a computer readable storage medium. Based on such an understanding, the technical solutions of the embodiments of the invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of the invention. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific examples of implementations of embodiments the invention, but are not intended to limit the protection scope of the embodiments of the invention. Any variation or replacement readily figured out by a person skilled in the art within the technical scope of the embodiments disclosed herein shall fall within the protection scope of the embodiments of invention. Therefore, the protection scope of the embodiments of invention shall be subject to the protection scope of the claims.

What is claimed is:

1. A data transmission method used in a virtual switch, the method comprising:
   receiving, by a hypervisor, an IO request sent by a virtual machine (VM) that is within a user mode operation space, where the hypervisor is configured to operate in either a user mode or a kernel mode;
   determining, by the hypervisor operating in the user mode, that the IO request needs to be sent to a physical network interface controller (NIC) that is within a physical layer coupled to the user mode operation space via a kernel mode operation space, by using a user mode Open virtual switch (OVS) that is within the user mode operation space;
   converting, by the hypervisor operating in the user mode, the IO request into an Internet Small Computer Systems Interface (iSCSI) command within the user mode operation space, including converting the IO request into a Small Computer System Interface (SCSI) command, and adding an Internet Small Computer Systems Interface (iSCSI) header to the SCSI command to obtain the iSCSI command; and
   sending, by the hypervisor operating in the user mode, the iSCSI command to the user mode OVS within the user mode operation space wherein the user mode OVS is configured to send the iSCSI command to the physical NIC, and wherein the hypervisor continues operating in the user mode without switching a context to the kernel mode during the sending operation.

2. The method according to claim 1, wherein determining that the IO request needs to be sent to a physical NIC by using the user mode OVS further includes:
   determining disk information of a disk to be accessed by the IO request or a disk in which a file to be accessed by the IO request is located;
   determining, according to the disk information, that the disk to be accessed by the IO request is a disk of a remote terminal; and
   in response to determining that the disk to be accessed by the IO request is the disk of the remote terminal, determining that the IO request needs to be sent to the physical NIC using the user mode OVS.

3. A data transmission method used in a virtual switch, the method comprising:
   receiving, by a hypervisor, an Internet Small Computer Systems Interface (iSCSI) packet returned by a physical NIC that is within a physical layer in response to an IO request, wherein the hypervisor is configured to operate in either a user mode or a kernel mode;
   determining that the iSCSI packet needs to be sent, by using a user mode Open virtual switch (OVS) that is within a user mode operation space that is coupled to the physical layer via a kernel mode operation space, to a virtual machine that initiates the IO request, and wherein the user mode OVS provides network interworking between virtual machines on a same host or virtual machines on different hosts;
   converting, by the hypervisor operating in the user mode, the iSCSI packet into an IO response within the user mode operation space, including converting the iSCSI packet into an SCSI response and converting the SCSI response into the IO response;
   sending, by the hypervisor operating in the user mode, the IO response to the virtual machine that initiates the IO request within the user mode operation space, and wherein the hypervisor continues operating in the user mode without switching a context to the kernel mode during the sending operation.

4. An electronic device, comprising:
a hypervisor that manages a plurality of virtual machines, wherein the hypervisor operates include a determining module and a conversion module, and operates in either a user mode or a kernel mode;
wherein the determining module is configured to receive an IO request sent by a virtual machine (VM) that is within a user mode operation space;
wherein the conversion module is configured to: if the IO request needs to be sent to a physical network interface controller (NIC) that is within a physical layer coupled to the user mode operation space via a kernel mode operation space, by using a user mode Open virtual switch (OVS) that is within the user mode operation space, convert the IO request into an Internet Small Computer Systems Interface (i SC SI) command in a user mode by converting the IO request into a Small Computer System Interface (SCSI) command and adding an Internet Small Computer Systems Interface (iSCSI) header to the SCSI command to obtain the iSCSI command, and then send the iSCSI command to the user mode OVS within the user mode operation space, wherein the user mode OVS is configured to send the iSCSI command to the physical NIC; and
wherein the hypervisor continues operating in the user mode without switching a context to the kernel mode while the conversion module sends the iSCSI command to the physical NIC.

5. The electronic device according to claim 4, wherein the determining module is further configured to:
determine disk information of a disk to be accessed by the IO request or a disk in which a file to be accessed by the IO request is located; determine, according to the disk information, whether the disk to be accessed by the IO request is a disk of a remote terminal; and
if the disk to be accessed by the IO request is the disk of the remote terminal, determine that the IO request needs to be sent to the physical NIC by using the user mode OVS.

6. An electronic device, comprising:
a hypervisor that manages a plurality of virtual machines, wherein the hypervisor operates include a receiving module and a conversion module, and operates in either a user mode or a kernel mode;
wherein the receiving module is configured to: receive an Internet Small Computer Systems Interface (iSCSI) packet returned by a physical NIC that is within a physical layer in response to an IO request, wherein the iSCSI packet needs to be sent, by using a user mode Open virtual switch (OVS) that is within a user mode operation space that is coupled to the physical layer via a kernel mode operation space, to a virtual machine that initiates the IO request, and the user mode OVS provides network interworking between virtual machines on a same host or virtual machines on different hosts;
wherein the conversion module is configured to: convert the iSCSI packet into an IO response within the user mode operation space by converting the iSCSI packet into an SCSI response and the SCSI response into the IO response, and then send the IO response to the virtual machine that initiates the IO request within the user mode operation space; and
wherein the hypervisor continues operating in the user mode without switching a context to the kernel mode while the conversion module sends the IO response to the virtual machine.

7. A non-transitory computer storage medium configured to store software instructions that are executable by a processor of a computer to cause the computer to perform the method according to claim 1.

8. A non-transitory computer storage medium configured to store software instructions that are executable by a processor of a computer cause the computer to perform the method according to claim 3.

9. The method of claim 1, wherein the user mode OVS implements network interworking between virtual machines on one or more hosts.

10. The method of claim 9, wherein the IO request is further transmitted from a host hosting the virtual machine that sends the IO request to a different host.

11. The method of claim 1, wherein iSCSI header added to the ISCI command is encapsulated according to an iSCSI protocol, and includes one or more of a basic header segment, an additional header segment, a header-digest, and a data-digest.

12. The method of claim 3, wherein iSCSI header added to the ISCI command is encapsulated according to an iSCSI protocol, and includes one or more of a basic header segment, an additional header segment, a header-digest, and a data-digest.

* * * * *